Patented Aug. 9, 1949

2,478,710

UNITED STATES PATENT OFFICE 2,478,710

METHOD OF STABILIZING HYDROCARBONS

Richard F. Robey, Cranford, N. J., assignor to Standard Oil Development Company, a corporation of Delaware No Drawing. Application December 21, 1945, Serial No. 636,498

7 Claims. (Cl. 260—666.5)

This invention relates to stabilizing hydrocarbons, and particularly of minimizing oxidation and polymerization through the employment of inhibitors.

The instability of hydrocarbon mixtures produced in petroleum refineries, especially of cracked gasolines and certain lubricating oils, has been extensively studied. The changes which have been found to occur in these hydrocarbon mixtures in contact with air or oxygen are considered due primarily to auto-oxidation reactions wherein there are formed oxidized, condensed and polymerized compounds which either remain in the solution or in time separate as gummy deposits which adversely affect the quality of the material or interfere with processing in the refinery. The use of various type compounds in relatively small proportions as inhibitors is a common means of combating such instability. In some cases, the inhibitor employed consists of a single compound, while in other cases it is a mixture of compounds, such as in co-pending application U. S. Serial No. 537,540, filed April 26, 1944, now U. S. Patent No. 2,445,367. The present invention is concerned with a mixture of compounds as an inhibitor composition, the particular advantage in the admixture being the uniqueness of its liquid condition.

In the manufacture of synthetic rubber and synthetic resins, the lower molecular weight diolefins are used as basic materials. Thus, butadiene, isoprene, cyclopentadiene, and the piperylenes are commonly extracted in high degrees of purity as raw materials for the preparation of important synthetics. Unsaturated compounds such as styrene are also employed. In handling and processing unsaturated hydrocarbons, control of stability is important, especially from the point of view of plant safety and minimizing the loss of production time due to stoppage of equipment with solid polymers. In shipment and storage before use, good stability is necessary for maintenance of product quality and suitability for various purposes. The formation of the high molecular weight polymers from unsaturated monomers has been shown to be catalyzed by the presence of peroxides which are easily formed upon exposure of the material itself to an atmosphere containing oxygen or to peroxide catalysts. (Robey et al., Ind. Eng. Chem. 36, 3 (1944).)

In the use of inhibitors, particular difficulty is often presented in the means by which the compounds may be added. In the case of solid materials, concentrated solutions are commonly prepared and then such solutions blended with the main volume of hydrocarbon material. The preparation and storage of concentrates are beset with many difficulties. In the present invention, uniqueness of the inhibitor composition is that two different inhibitor type compositions are employed which exert a liquefying effect one upon the other. Particular examples of the applicant's compositions have liquid consistencies at temperatures well below those individual compounds by reason of their association together in proportions approximating that of an eutectic for the combination of the substances. In other words, the inhibitor compositions of the present invention are highly concentrated inhibitor mixtures, the liquid condition of which is obtained as a result of a mutual blending effect approaching eutectic conditions as the final low temperature blend.

The liquid inhibitor compositions of the invention consist of mixtures of substituted polyhydroxy-benzenes, preferably a catechol in which the substituent is preferably, but not necessarily, an alkyl chain, and a naphthol, that is, either alpha or beta naphthol of substituted or unsubstituted character. The alkyl substituted catechols and the naphthols are normally solid materials under ordinary atmospheric conditions. When blended together, however, with the catechol in the predominant proportion, the blends can be made to assume a composition melting below room temperature. The inhibitor compositions of this invention are the liquid blends of such substituted catechols and naphthols.

Thus, it has been found that solid tertiary butyl catechol is particularly effective as an inhibitor in hydrocarbon polymerization systems at temperatures ranging from about 20° C. to about 60 or 80° C. Alpha naphthol, on the other hand, is relatively more effective as an inhibitor for hydrocarbon polymerization reactions at temperatures of about 110° C., but not so effective at lower temperatures. When either of the substances is added alone to plant equipment, difficulties occur in the process of solution of the inhibitor, also difficulties in control of their rate of addition. Moreover, the range of maximum effectiveness of the single inhibitor is limited. However, when a mixture comprising about 90% tertiary butyl catechol and 10% alpha naphthol are compounded together, a liquid mass is obtained at normal conditions (25° C.). This liquid blend of the two inhibitors is effective as an inhibitory material for hydrocarbon polymerization reactions over a wide range of temperatures and is as easily handled as any liquid in the processing of petroleum hydrocarbons. The blend also easily disperses itself throughout hydrocarbon liquids.

The following data are presented to illustrate the above-mentioned effect of temperature range effective for tertiary butyl catechol and alpha naphthol in systems containing initially 100 parts per million of peroxides calculated as active oxygen in an aromatic hydrocarbon mixture confined in steel equipment:

| Temp., °C. | Inhibitor | Fraction of Active Oxygen Destroyed Per Hour |
|---|---|---|
| 80 | None | 0.00 |
| 80 | Tertiary Butyl Catechol | 0.18 |
| 80 | Alpha Naphthol | 0.06 |
| 110 | None | 0.00 |
| 110 | Tertiary Butyl Catechol | 0.21 |
| 110 | Alpha Naphthol | 1.0 |

The disappearance of active oxygen was followed by the well-known ferrous thiocyanate colorimetric method. These data show the relative superiority of tertiary butyl catechol at temperatures of about 80° C., while alpha naphthol is more effective at temperatures of about 110° C. When a mixture of 90% by weight of tertiary butyl catechol (solid at 52° C.) and 10% alpha naphthol (solid at 96 C.) was prepared, a liquid freezing at 25° C. was obtained. The liquid so obtained is mobile, easily handled and pumped through pipes. The following data were obtained in connection with the polymerization of essentially pure isoprene at 100° C. in the presence of 100 parts per million of peroxides calculated as active oxygen:

| Inhibitor | Rate of Polymerization to High Polymer, Weight Percent Per Hour |
|---|---|
| None | 0.43 |
| 0.22% Mixture Tertiary Butyl Catechol and Alpha Naphthol | 0.03 |

This mixture is, moreover, easily removable from hydrocarbon solution by washing the solution with dilute caustic soda solution or by simple distillation of the hydrocarbons boiling below 150° C.

What is claimed is:

1. A composition of matter stabilized against oxidation and polymerization which consists of an unsaturated hydrocarbon and a stabilizing amount of a liquid mixture consisting of a naphthol and an alkyl catechol, said mixture having a melting point below that of either said components and being a liquid at room temperature.

2. A composition of matter stabilized against oxidation and polymerization which consists of a diolefin hydrocarbon and a stabilizing amount of a liquid mixture consisting of a naphthol and an alkyl catechol, said mixture having a melting point below that of either said components and being a liquid at room temperature.

3. A composition of matter according to claim 2 in which the liquid mixture consists of about 90% alkyl catechol and 10% naphthol and being a liquid at room temperature.

4. A composition of matter according to claim 3 in which the liquid mixture consists of about 90% tertiary butyl catechol and 10% alpha naphthol and being a liquid at room temperature.

5. A composition of matter stabilized against oxidation and polymerization which consists of butadiene and a stabilizing amount of a liquid mixture consisting of a naphthol and an alkyl catechol, said mixture having a melting point below that of either said components and being a liquid at room temperature.

6. A composition of matter stabilized against oxidation and polymerization which consists of isoprene and a stabilizing amount of a liquid mixture consisting of a naphthol and an alkyl catechol, said mixture having a melting point below that of either said components and being a liquid at room temperature.

7. A composition of matter stabilized against oxidation and polymerization which consists of cyclopentadiene and a stabilizing amount of a liquid mixture consisting of a naphthol and an alkyl catechol, said mixture having a melting point below that of either said components and being a liquid at room temperature.

RICHARD F. ROBEY.

REFERENCES CITED

The following references are of record in the file of this patent:

UNITED STATES PATENTS

| Number | Name | Date |
|---|---|---|
| 2,023,110 | Wilson | Dec. 3, 1935 |
| 2,107,069 | Evans | Feb. 1, 1938 |
| 2,116,220 | Shoemaker | May 3, 1938 |
| 2,171,795 | Kautter | Sept. 5, 1939 |
| 2,361,538 | Franz | Oct. 31, 1944 |

FOREIGN PATENTS

| Number | Country | Date |
|---|---|---|
| 408,229 | Great Britain | Mar. 29, 1934 |